United States Patent [19]
Wong

[11] Patent Number: 5,940,162
[45] Date of Patent: Aug. 17, 1999

[54] ASSEMBLING STRUCTURE FOR ASSEMBLING A FIT-ON SPECTACLE FRAME WITH AN ORIGINAL SPECTACLE FRAME

[76] Inventor: Ping-Cheuk Wong, Rm. 811, 8/F., Shun Fat Industrial Bldg., 17, Wang Hoi Rd., Kowloon, The Hong Kong Special Administrative Region of the People's Republic of China

[21] Appl. No.: 09/096,203

[22] Filed: Jun. 11, 1998

[51] Int. Cl.[6] .......................................... G02C 9/00
[52] U.S. Cl. ................................. 351/47; 351/57
[58] Field of Search .................... 351/47, 57, 48, 351/58, 41, 44

[56] References Cited

U.S. PATENT DOCUMENTS 5,737,054  4/1998  Chao .......................................... 351/47

Primary Examiner—Hung Xuan Dang
Attorney, Agent, or Firm—Pro-Techtor International Services

[57] ABSTRACT

An assembling structure for assembling a fit-on spectacle frame with an original spectacle frame. Rectangular magnets with very small volume are inserted in rectangular sockets of the bridges of the original spectacle frame and fit-on spectacle frame. The magnets are aligned with each other and magnetic attracted by each other. After the fit-on spectacle frame is assembled with the original spectacle frame, the appearance of the spectacles remains unchanged. The bridge of the original spectacle frame is formed with a locating hole, while the bridge of the fit-on spectacle frame is formed with a projecting locating pin, whereby the fit-on spectacle frame can be more accurately located and more firmly assembled with the original spectacle frame without detachment.

2 Claims, 4 Drawing Sheets

ASSEMBLING STRUCTURE FOR ASSEMBLING A FIT-ON SPECTACLE FRAME WITH AN ORIGINAL SPECTACLE FRAME

BACKGROUND OF THE INVENTION

The present invention relates to an assembling structure for assembling a fit-on spectacle frame with an original spectacle frame. The assembling structure enables the fit-on spectacle frame to fit with the spectacle frame in a unified appearance and structure. Also, the assembling structure is able to more firmly associate the fit-on spectacle frame with the spectacle frame without detachment even during dynamic action of a wearer.

It is known that a fit-on spectacle frame can be directly assembled with an original spectacle frame so as to expand the function of the spectacles. For example, a pair of sunglasses can be assembled with a pair of reading glasses. Such fit-on spectacle frame is detachably assembled with the original spectacle frame by means of various kinds structures. In a conventional assembling structure, the fit-on spectacle frame is detachably assembled with the original one by magnetic members. In such structure, each side of each corner piece of the spectacle frame is disposed with a cylindrical first magnetic member and each side of the fit-on spectacle frame is disposed with a stopper rod (extending arm) to be supported on top edge of the corner piece. The stopper rod is disposed with a second magnetic member corresponding to the first magnetic member. The first and second magnetic members can attract each other so as to detachably combine the original and fit-on spectacle frames with each other.

In the conventional assembling structure, the magnetic members are exposed outside, that is, when not assembled, the cylindrical first magnetic member and the second magnetic member can be easily found at specific portions of the spectacle frames. This leads to poor appearance of the spectacle frames.

SUMMARY OF THE INVENTION

It is therefore a primary object of the present invention to provide an assembling structure for assembling a fit-on spectacle frame with an original spectacle frame. Slender rectangular magnets with very small volume are inserted and hidden in rectangular sockets of the bridges of the original spectacle frame and fit-on spectacle frame without changing the original profile of the spectacles. After the fit-on spectacle frame is assembled with the original spectacle frame, the appearance of the spectacles remains tidy and no projecting section will be seen.

The present invention can be best understood through the following description and accompanying drawings, wherein:

DETAILED DESCRIPTION OF THE PREFERRED EMBODIMENT

Figure 1:
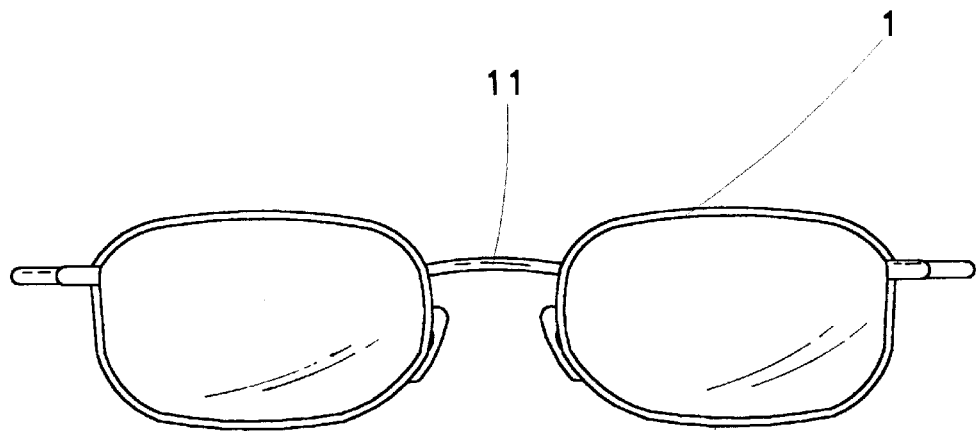
FIG. 1 is a front view of the original spectacle frame of the present invention.
Figure 2:
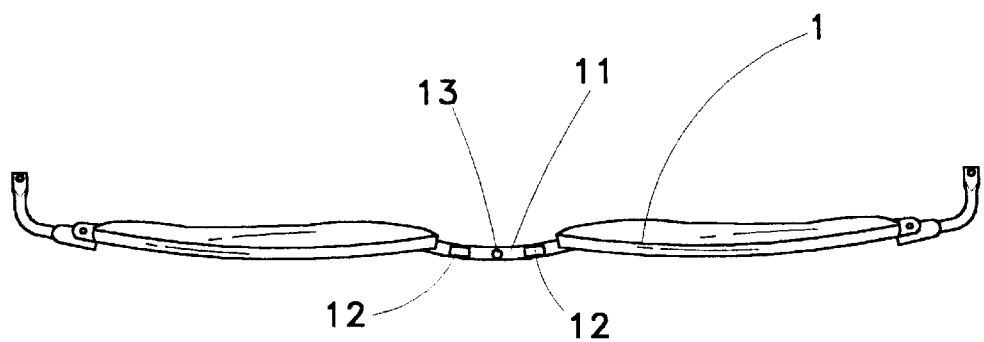
FIG. 2 is a top view of the original spectacle frame of the present invention.
Figure 3:
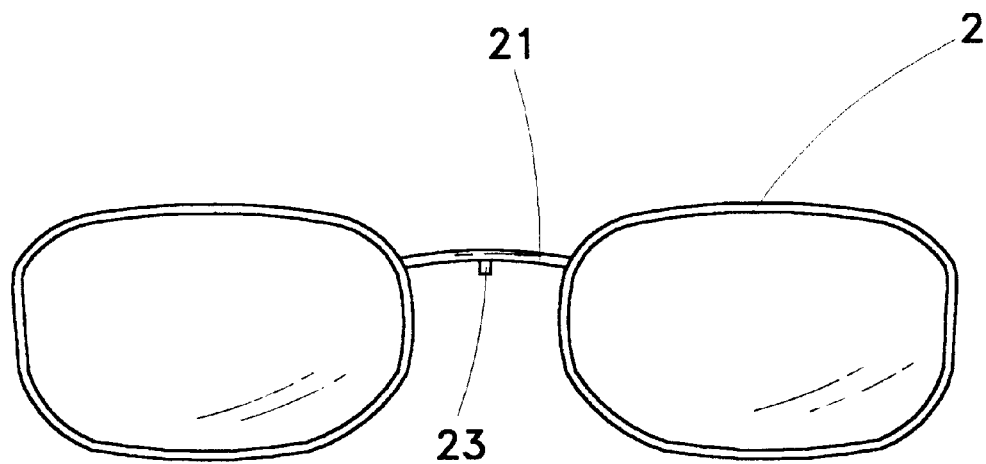
FIG. 3 is a front view of the fit-on spectacle frame of the present invention.
Figure 4:
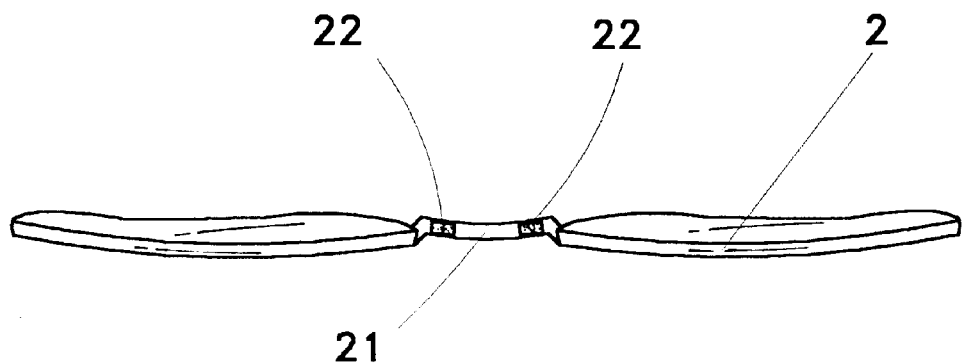
FIG. 4 is a top view of the fit-on spectacle frame of the present invention.
Figure 5:
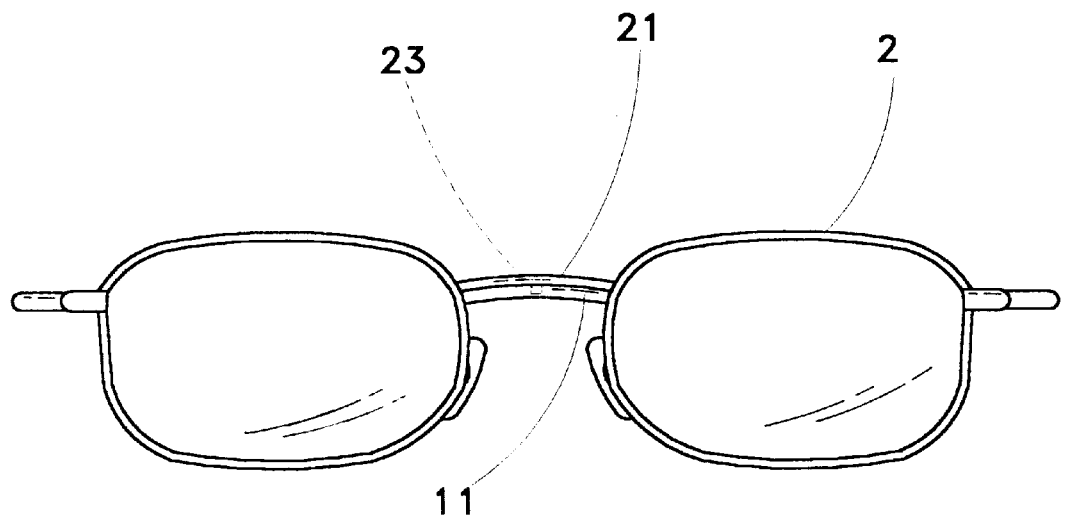
FIG. 5 is a front assembled view of the original and fit-on spectacle frames of the present invention.
Figure 6:
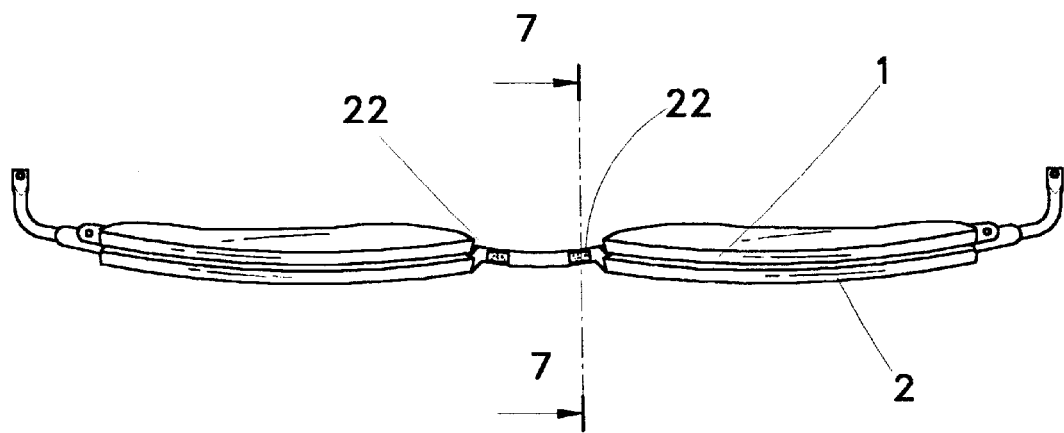
FIG. 6 is a top assembled view of the original and fit-on spectacle frames of the present invention.
Figure 7:
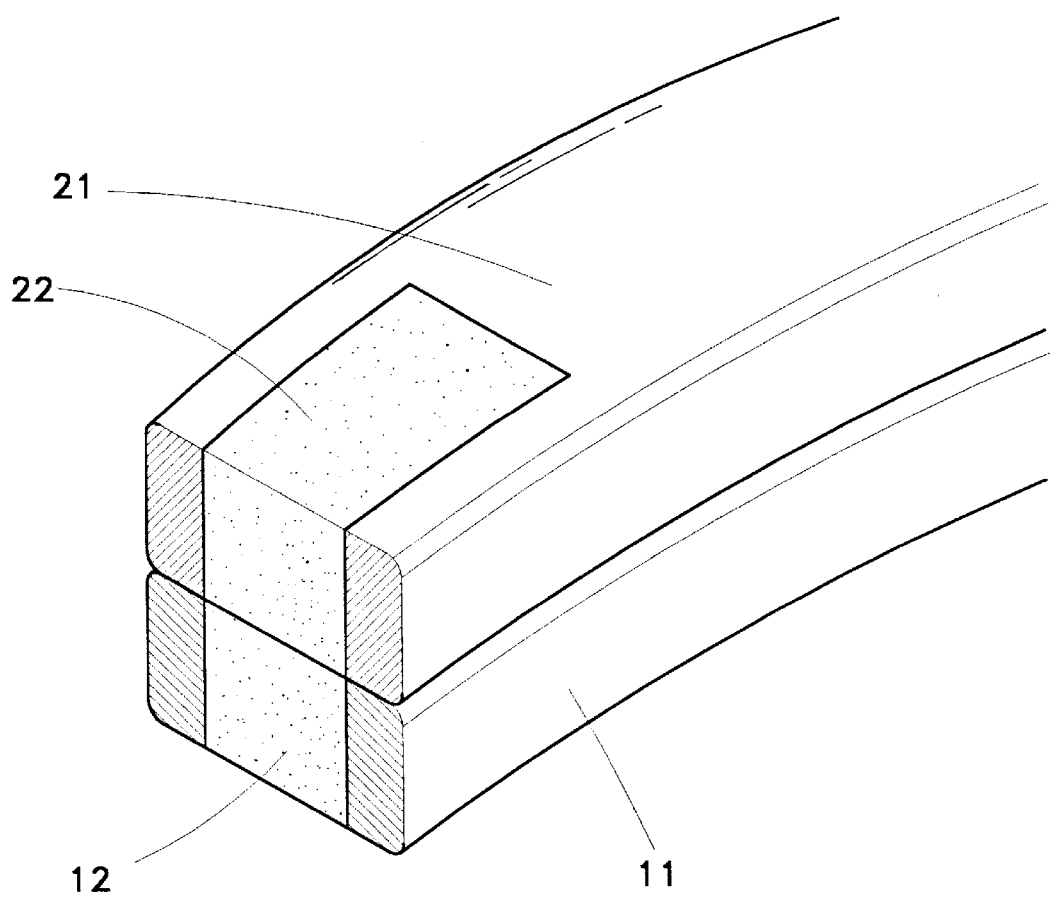
FIG. 7 is a sectional view of a part of the bridges of spectacle frames of the present invention.

Please refer to FIGS. 1 to 6. Two rectangular sockets are respectively formed on two sides of the bridge 11 of the original spectacle frame 1 for inserting therein a magnet 12. Also, two identical rectangular sockets are respectively formed on two sides of the bridge 21 of the fit-on spectacle frame 2 for inserting therein a small magnet 22. The bridge 21 of the fit-on spectacle frame 2 inward extends (as shown in FIG. 4), whereby when the fit-on spectacle frame 2 is associated with the original spectacle frame 1, the magnets 22 are overlaid on the magnets 12 and attracted by a strongest magnetic force.

Moreover, the upper side of the center of the bridge 11 of the original spectacle frame 1 is formed with a locating hole 13, while the lower side of the center of the bridge 21 of the fit-on spectacle frame 2 is formed with a projecting locating pin 23. Therefore, when the fit-on spectacle frame 2 is assembled with the spectacle frame 1, the locating pin 23 is inserted and located in the locating hole 13 so as to prevent the magnets 12, 22 from relatively slipping due to transverse pushing force (when holding the spectacles with a hand) or longitudinal pulling force (when the spectacles are placed upright). Therefore, the fit-on spectacle frame 2 is prevented from detaching from the original spectacle frame 1. The locating pin 23 is snugly inserted into the locating hole 13 so that the fit-on spectacle frame 2 is more firmly assembled with the original spectacle frame 1 and the appearance thereof will not be affected.

The magnets 12, 22 have slender rectangular shape (3 mm*1.8 mm*1.5 mm), whereby the contacting area between two magnets 12, 22 is up to 3 mm*1.8 mm=5.4 square mm. Therefore, it is ensured that the original spectacle frame 1 is assembled with the fit-on spectacle frame 2 by a sufficient magnetic attractive force. Moreover, such dimension permits the bridge 11 of the original spectacle frame 1 and the bridge 21 of the fit-on spectacle frame 2 to receive the magnets 12, 22 without enlarging the dimension of the bridges 11, 21. Also, the magnets 12, 22 are designed in a hidden state so that no matter whether the original spectacle frame 1 is assembled with the fit-on spectacle frame 2 or not, the spectacle frame 1 has an appearance just like the original appearance.

It is to be understood that the above description and drawings are only used for illustrating one embodiment of the present invention, not intended to limit the scope thereof. Any variation and derivation from the above description and drawings should be included in the scope of the present invention.

What is claimed is:

1. An assembling structure for assembling a fit-on spectacle frame with an original spectacle frame, comprising:
   two sockets formed on sides of a bridge of the original spectacle frame and two sockets formed on sides of a bridge of the fit-on spectacle frame,
   a magnet is received in each of the sockets,
   an upper side of the bridge of the original spectacle frame includes a locating hole, and
   the bridge of the fit-on spectacle frame extends inward and includes on a lower side thereof a projecting locating pin; whereby when the fit-on spectacle frame is associated with the original spectacle frame, the magnets of the fit-on spectacle frame are brought into proximity to and are attracted by the magnetic force of the magnets of the original spectacle frame, and the locating pin of the bridge of the fit-on spectacle frame is received in the locating hole of the original spectacle frame, thereby further strengthening the connection of the fit-on spectacle frame with the original spectacle frame.

2. An assembling structure as claimed in claim 1, wherein: each magnet measures approximately 3.0 mm×1.8 mm×1.5 mm.

* * * * *